United States Patent Office 2,873,236
Patented Feb. 10, 1959

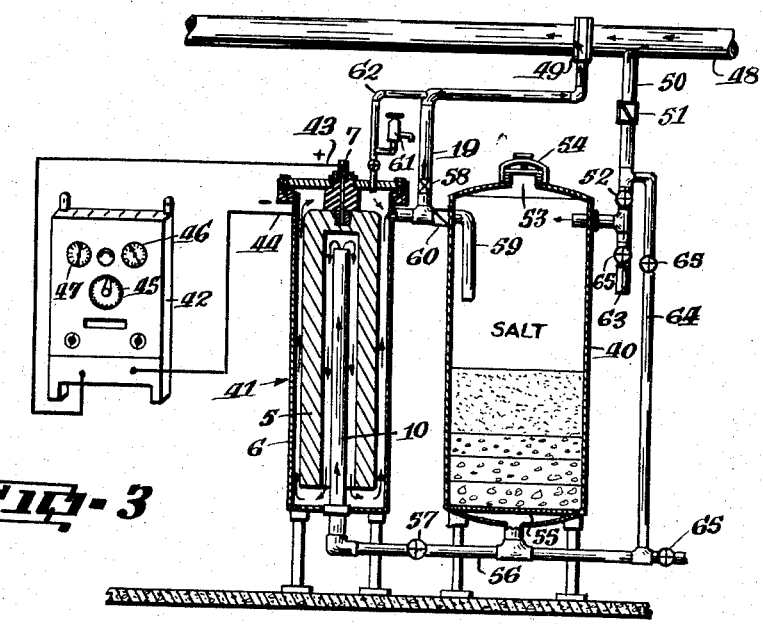
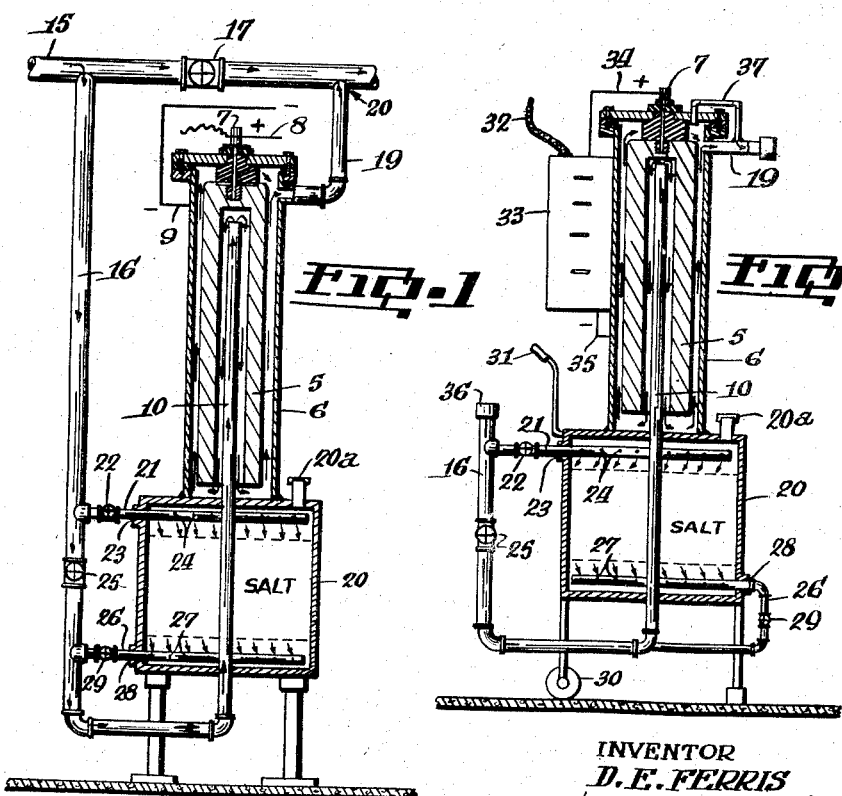

2,873,236

METHOD FOR PRODUCING HYPOCHLORITE OF SODA IN AN ELECTRONIC CELL

Donald Edward Ferris, Dartmouth, Nova Scotia, Canada

Application May 10, 1951, Serial No. 225,573

3 Claims. (Cl. 204—95)

This invention relates to improvements in the production of hypochlorite of soda for the treatment of water. More particularly, this invention provides an exceptionally rapid and efficient method of treating fresh water, ordinary sea water or a strong brine solution in transit under pressure with or without filtration, by passing all or some of the liquid through an electronic cell which, reacting with the liquid, creates a high concentrate of hypochlorite of soda in the liquid for the desired amount of chlorine necessary for sterilization as well as for carrying off chlorine residual as desired.

Another object of this invention is to provide an electronic cell apparatus which is adapted for connection to a fresh or sea water conduit to receive therefrom at least a portion of the water in transit and under pressure and means activating said cell to create a high concentrate of hypochlorite of soda for the release of chlorine in the water passing therethrough in sufficient quantities to effect sterilization of the water in the main conduit.

Another object is to provide a portable apparatus of the character described which is adaptable for connection to any source of water supply.

In one application of this invention, by using sea water which usually carries a salt content of about 3%, tests have shown that a very high chlorine yield is produced. It thus evolves that under normal conditions where sea water is to be treated, no additional amount of salt is required to produce the desired sterilizing effects according to my invention. This is a very important factor especially where this electronic cell apparatus is used in conjunction with the fishing industry, such as in the fish plants, on trawlers, on power vessels and the like, or where it is not desirable to increase the salt content.

Also important is the use of this apparatus for sterilization of sewers, contaminated beaches, clam beds and the like. The apparatus may also be very effectively employed with swimming pool installations for sterilization of the water, and especially for the exceptional results in the non-caustic residual that is obtained. This eliminates irritation to bathers' skin, eyes, etc.

Proceeding now to a more detailed explanation, reference will be had to the accompanying drawings, in which:

Fig. 1 is a vertical sectional view of an apparatus embodying my invention.

Fig. 2 is a vertical sectional view of a modified form of the apparatus shown in Fig. 1.

Fig. 3 is a vertical sectional view of an apparatus employed with a pressure type brine and filtration tank for large flows of water.

Referring more particularly to the drawings, in Fig. 1 I have shown a single cell apparatus for the treatment of ordinary sea water (3% salt, approx.) or fresh water. The apparatus comprises a hollow positive electrode 5 preferably of graphite or carbon, which is suspended within a casing 6 in spaced relation to the walls thereof. A positive electrode terminal 7 insulated from the casing 6 projects through one end of the casing for connection to one terminal 8 of a source of current. The casing 6 is connected to the other terminal 9 of a source of current, thereby rendering the casing a negative electrode. A hollow pipe 10 passing upwardly through the base of casing 6 projects between the walls of electrode 5 and in spaced relation thereto with the free open end of the pipe spaced slightly below the upper end of electrode 6. Pipe 10, which is grounded to the base of casing 6, serves as another negative electrode.

In the treatment of ordinary sea water flowing through a main 15, a portion of the sea water is diverted through a cell feed line 16 by the regulation of a valve 17 in the main line 15. The cell feed line 16 is connected to the lower end of hollow pipe 10. The sea water enters the cell through hollow pipe 10 which acts as a negative electrode when the water commences to overflow between the inner walls of electrode 5 and the outer wall of pipe 10 producing hypochlorite of soda. The flow continues upwardly between the outer wall of electrode 5 and the inner wall of casing 6 which, in turn, serves as a negative electrode to continue the production of hypochlorite of soda and then the resultant treated flow is carried through discharge pipe 19 into the main stream, as indicated at 20 where sterilization of the sea water is effected by the introduction thereto of chlorine released from the hypochlorite of soda produced in the cell.

The sea water is forced under pressure down through the centre of electrode 5 and then up between casing 6 and the outside of electrode 5. This provides a very rapid mixing in the cell while the sea water is in transit, and no losses of the desired sterilizing agencies occurs as they are constantly being mixed back into the solution. This rapid mixing creates facilities whereby the chlorine and alkali hydroxide liberated at the anode and cathode respectively, are brought into intimate contact so that the two can react, thereby producing a high concentrate of sodium hypochlorite. The sea water is practically neutral on entering the cell and in the process of decomposition a small amount of chlorine is released and reacts with the solution in the cell. This tends to create a slightly acid condition in the solution which is very desirous for rapid destruction of bacteria, as a solution containing one gram mole of hypochlorite contains 70 grams of active chlorine. This result is greatly accelerated in an acid solution.

If a higher concentrate is desired from the sea water or if the apparatus is to be used on fresh water, salt is added to the water. The apparatus is provided with a salt feed pot 20 which is filled or partially filled with a coarse salt through a filling cap 20a. A water inlet pipe 21 having a feed valve 22 is connected at one end to cell feed line 16 and projects into the upper portion of pot 20 through a side opening 23 in the pot. Pipe 21 is provided with spaced openings 24 along its length within the pot which permits equal distribution of the water across the surface of the salt. A valve 25 in cell feed line 16 beyond inlet pipe 21 regulates the flow of water into the pot. This is accomplished by opening valve 22 and partially closing valve 25. As the water passes through the salt, some of the salt is absorbed by the water. An outlet pipe 26 at the bottom of pot 20 is provided with openings 27 along the length within the pot through which the salt saturated water passes into the pipe. Pipe 26 extends through side opening 28 in the pot and thence through a regulating valve 29 to the cell feed line 16 on the remote side of valve 25. The water with the salt added thereto then passes through pipe 10 into the cell where it is subjected to the aforementioned treatment. It will be appreciated that the stronger the salt content is of the water to be treated, the greater the yield of chlorine will be. This can be controlled by adjustment of valve 29 on outlet pipe 26.

In Fig. 2 I have shown a modified form of the apparatus shown in Fig. 1. This modified apparatus is provided with wheels 30 on the rear legs and a handle member 31 so that the apparatus may be portable. The source of current may be taken from a power line through cable 32 to a rectifier 33 which is then connected to the positive and negative poles of the cell, as indicated at 34 and 35. The rectifier has a rheostat (not shown) which regulates the flow current to the cell for increasing or decreasing the production of chlorine. Thus, for example, with a unit-flow rate of 50 G. P. M., chlorine from 1 part to 20 parts per million may be produced by increasing or decreasing the flow of current by means of rheostat control. The cell feed line 16 and discharge line 19 are provided with any suitable coupling members 36 connectible to a water main for treatment of the water flowing therethrough. A pipe 37 between the head of casing 6 and discharge line 19 provides an escape passage for trapped chlorine in the casing.

Fig. 3 shows an apparatus for the treatment of large flow rates of sea water or fresh water. The apparatus generally consists of a tank 40 which serves as a salt feeder and filter media for the water prior to its passage to an electronic chlorinating cell 41, and a rectifier 42.

Rectifier 42, which receives a source of current by conventional means (not shown), is connected to the positive and negative electrodes of cell 41, as indicated at 43 and 44, respectively. Current to the cell is controlled and regulated by a rheostat 45. The desired amperage is registered on D. C. ampere meter 46 and D. C. voltage is registered on meter 47.

Water flowing through a main 48 which is equipped with an orifice 49 is partially diverted through a feed line 50 by reason of a restricted throat in the orifice. Feed line 50, having a check valve 51 and an inlet valve 52 along its length carries the diverted water to filter tank 40. The upper portion of the tank contains a coarse salt which is fed into the tank through an opening 53 in the top of the tank provided with a cover 54. When cover 54 is in place the system works under pressure. The remainder of the tank has layers of filter media which may consist of fine sand and fine, medium and coarse gravel on top of a filter screen 55.

The water which passes through the salt and filters of the tank is fed to a brine inlet pipe 56 through cell inlet valve 57 up through pipe 10 and into the cell 41 for treatment by the positive and negative electrodes of the cell in the manner heretofore described, and then passes through discharge pipe 19 provided with a check valve 58, and back to the main stream through suitable passage in orifice 49 where sterilization of the water is effected. The strength of sodium hypochlorite is determined by adjustment of rheostat 45 to increase or decrease amperage on electrode 5 in conjunction with the strength of the brine density after it has passed through filter screen 55 of tank 40. The bacteriacidal effect of sodium hypochlorite is greatly accelerated when the brine is on the acid side. This can be effected in the present invention by high amperage controlled by rheostat 45 and by retarding flow through the cell by adjustment of check valve 58 in the discharge pipe 19.

If the flow of chlorinated water is stopped, an equilibrium is reached between cell 41 and tank 40 as pressure is automatically equalized in both units. This is accomplished with a by-pass pipe 59 from discharge pipe 19 to tank 40 with a check valve 60 in pipe 59. When the flow discharge to the main is stopped and the current is still on, a pressure builds up in the cell 41 forcing the check valve 60 open, thus allowing the sodium hypochlorite to enter tank 40 which sets up an automatic circulation between cell 41 and tank 40. In doing so this greatly increases the chlorine content of the water. To forestall any danger which might be created by pressure built up in cell 41, a release valve 61 is provided in an auxiliary discharge line 62 by-passing valve 58 in pipe 19. Release valve 61 is set to open at a predetermined pressure.

The system is also provided with back-wash pipes 63 and 64 on either side of inlet valve 52 for cleaning out the system. The back-wash pipes 63 and 64 are provided with valves 65 which are normally closed during the treatment stage of the water in the apparatus.

Having described what I now believe to be the preferred embodiments of this invention, it will be understood that changes and modifications thereto may be resorted to without departure from the scope and spirit of my invention as defined in the appended claims.

I claim:

1. A method of producing sodium hypochlorite which comprises continuously flowing a stream of an aqueous solution of sodium chloride in one direction through a hollow tubular electrode connected as cathode to one terminal of a source of electrical energy and then in a reverse direction between the outer surface of said electrode and the inner surface of a surrounding tubular electrode connected as anode to said source of electrical energy and again reversing the flow of said stream and causing it to flow to a point of discharge between the outer surface of said second electrode and the inner surface of a third tubular electrode surrounding said second electrode and connected, as cathode, to said electrical source of energy.

2. A single cell method of producing sodium hypochlorite which comprises providing a hollow cathodic casing having a hypochlorite solution outlet at one end, arranging a hollow anodic electrode, closed at one end and open at the other end, within the casing with the open end of the anodic electrode opposed to but spaced from the end of the casing remote from the hypochlorite solution outlet and with the outer surface of the anodic electrode spaced from the surrounding surface of the casing, continuously flowing a relatively cool stream of an aqueous solution of sodium chloride into said anodic electrode from the open to the closed end of said electrode and confining said stream to a path of flow spaced from the surrounding wall of said electrode, reversing the flow of said stream at the closed end of the electrode to produce a counterflowing stream to the open end of said electrode between the first mentioned stream and the surrounding inner surface of the electrode, then reversing the flow of said second stream at the open end of said electrode to produce a further reversely flowing stream flowing between the outer surface of said electrode and the surrounding inner surface of said casing to and through said hypochlorite solution outlet, connecting said anodic electrode to the positive terminal of a source of electrical energy and connecting said cathodic casing to the negative terminal of said source of electrical energy.

3. A method as set forth in claim 2, in which said first mentioned stream is confined to a path of flow spaced from said surrounding wall of the anodic electrode by a tubular confining element spaced from the inner surface of the anodic electrode and connected, as cathode, to said source of electrical energy.

References Cited in the file of this patent

UNITED STATES PATENTS

| 892,983 | Digby | July 14, 1908 |
| 1,397,239 | Slater | Nov. 15, 1921 |
| 2,011,171 | Baker | Aug. 13, 1935 |
| 2,099,801 | Everson | Nov. 23, 1937 |
| 2,180,668 | Delavenna et al. | Nov. 21, 1939 |
| 2,191,574 | Martin | Feb. 27, 1940 |

FOREIGN PATENTS

| 28,353 | Great Britain | Dec. 23, 1902 |
| 400,247 | Great Britain | Oct. 20, 1933 |